Nov. 21, 1967  C. C. BROWN  3,353,847
POWERED QUICK COUPLING DEVICE
Filed Sept. 2, 1965  2 Sheets-Sheet 2
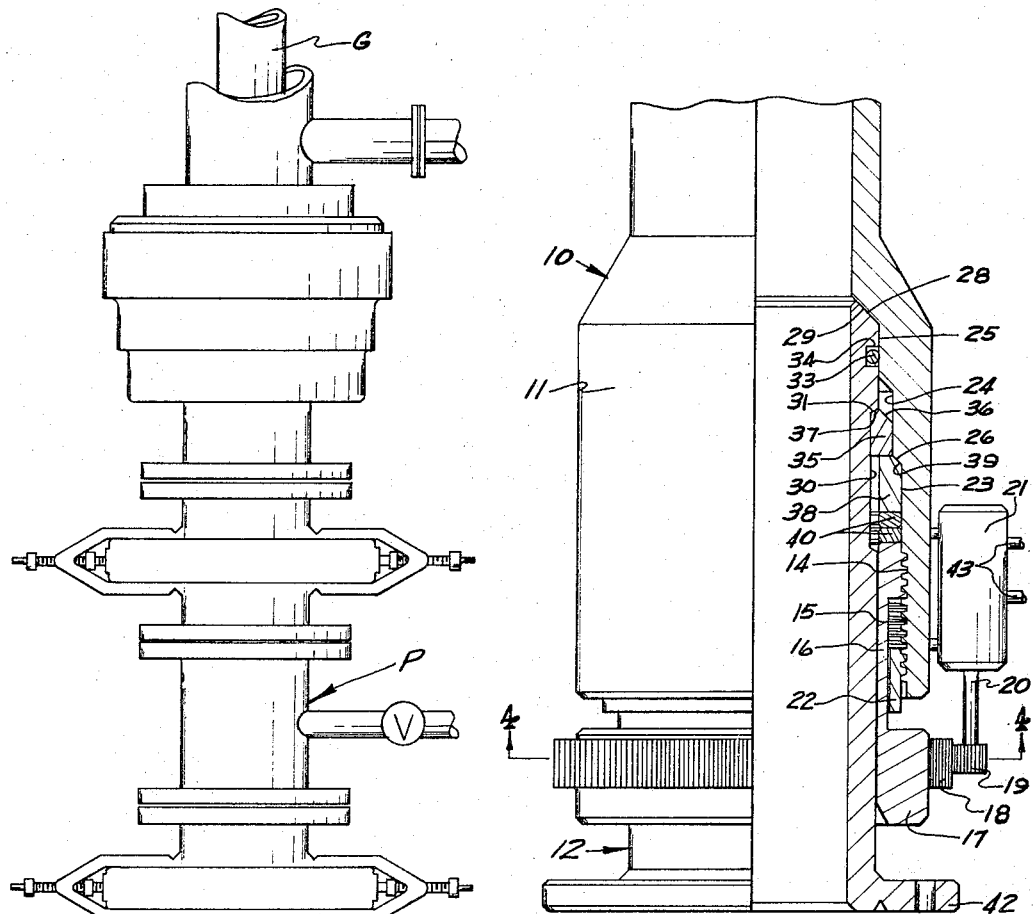
Fig. 2
Fig. 3
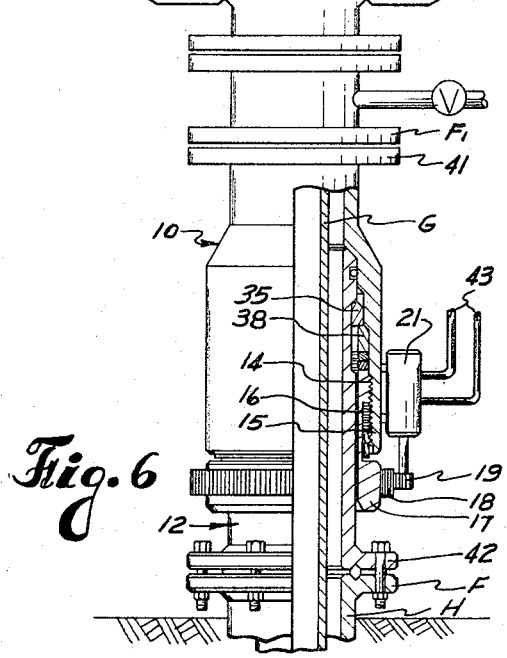
Fig. 6
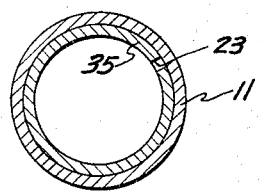
CICERO C. BROWN
INVENTOR.
BY
ATTORNEY United States Patent Office 3,353,847
Patented Nov. 21, 1967

3,353,847
POWERED QUICK COUPLING DEVICE
Cicero C. Brown, % Brown Oil Tools, Inc.,
P.O. Box 19236, Houston, Tex. 77024
Filed Sept. 2, 1965, Ser. No. 484,539
5 Claims. (Cl. 285—18)

ABSTRACT OF THE DISCLOSURE

A powered quick-coupling device comprising telescopically engageable tubular box and pin members, a split latch ring for connecting the members, and a powered drive collar for urging the latch ring into latching engagement between the members. The device includes antifriction bearing means between the drive collar and the latch ring and dual sealing between the members provided by a metal-to-metal seal and a non-metallic friction seal.

---

This invention relates to coupling devices for connecting pipe and the like, and more particularly to powered couplings for effecting quick connection and release between coupling members employed between large diameter pipe sections.

In the drilling and equipping of oil wells, particularly those being drilled in water bodies, it is frequently necessary to connect and disconnect pipe sections to each other and to various types of well head fittings often located below the water surface.

In such marine drilling operations the operations are commonly conducted through a very large diameter string of casing which extends from the drilling platform at or above the surface of the water body to a wellhead adjacent the underlying land. This is commonly called a "riser" pipe. Also, at a stage of operation it is generally necessary to install a composite set of fittings containing blowout preventers, or other types of seals and the like, which will ordinarily be assembled in a so-called "stack" and installed in its entirety on a connection provided at the wellhead.

Wherever possible it is desirable to avoid the use of divers in the sub-sea locations and to effect the connections mechanically by means operable from the surface. Because of the large diameters and massive nature of many of the connections considerable power is required for making the necessary connections.

Because of the relative motion frequently present between the pipe element or "stack" being lowered into position at a sub-surface location and the fitting which is in place to receive the element being lowered, it is often difficult to engage the coupling elements quickly while avoiding damage to these elements.

Accordingly, it is a primary object of the present invention to provide a coupling device by which the primary connection is effected by a freely slidable telescopic movement of one member with respect to the other and whereby the connection is completed by rotation through only a small number of turns of a coupling collar connected by a relatively coarse thread to the box member of the coupling device.

An important object is the provision of a coupling device of the general character mentioned in which the coupling collar is power-driven by power supplied from a remote location.

A further object is the provision of a coupling device employing a box member, a pin member slidably receivable in the box member, a split latch ring adapted to be positioned between the members, and a power-driven locking collar surrounding the coupling members and threadably connected to the box member by relatively coarse threads and arranged to urge the latch ring against an abutment on the pin member to prevent axial retraction of the latter from the box member.

Another object is the provision in a coupling device of the character described of antifriction bearing means arranged between the locking collar and the latch ring to reduce friction during rotation of the locking collar.

Still another object of the invention is to provide a quick coupling device which effects a strong metal-to-metal seal between the coupling elements by the employment of a comparatively few turns of the coupling collar and which may employ a resilient seal element as a secondary seal to supplement the sealing action of the metal-to-metal seal.

An additional object is the provision of a power-actuated coupling device of the character described in which the coupling collar and the power drive elements therefor are mounted on the box member of the coupling.

Other and more specific objects and advantages of this invention will become more readily apparent from the following detailed description when read in conjunction with the accompanying drawing which illustrates a useful embodiment in accordance with this invention.

In the drawings:

FIG. 2 is a similar view showing the coupling elements engaged;

FIG. 3 is a cross-sectional view taken along line 3—3 of FIG. 1;

FIG. 4 is a cross-sectional view taken along line 4—4 of FIG. 2;

FIG. 5 is a partly sectional, partly elevational view showing the manner of employment of the coupling device for connecting a riser pipe to a submerged wellhead; and FIG. 6 is a partly sectional, partly elevational view showing a blowout preventer stack connected to a submerged wellhead by means of the coupling device in accordance with this invention.

Figure 1:
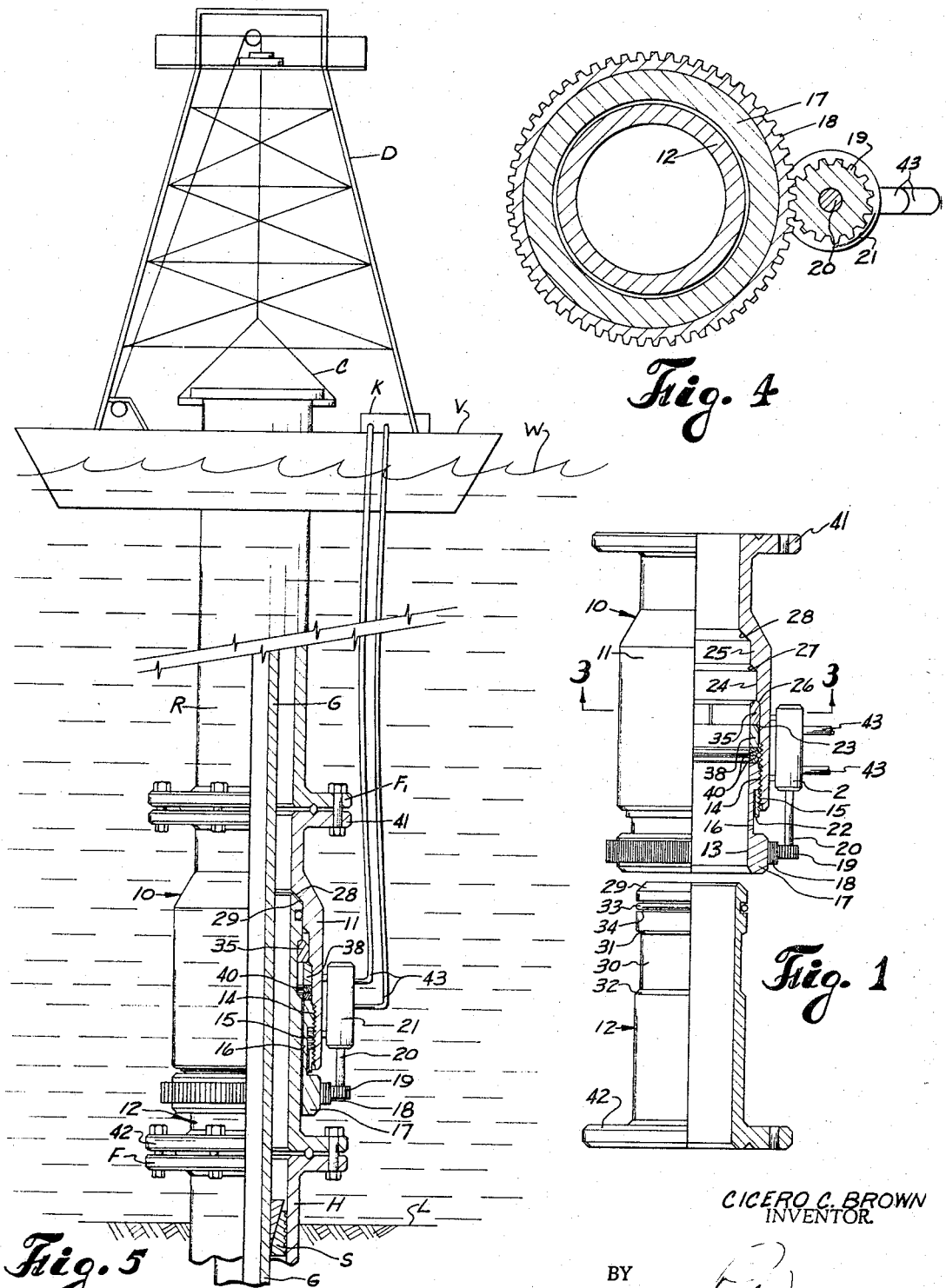
FIG. 1 is a partly sectional, partly elevational view showing the elements of the coupling device prior to engagement.

Referring to the drawing and to FIGS. 1 to 4, in particular, the coupling device in accordance with this invention comprises, a generally tubular female member or box member, designated generally by the numeral 10, including a socket or box 11, and a generally tubular male or pin member, designated generally by the numeral 12. The diameter of box 11 is made sufficiently greater than the external diameter of the pin member to provide a substantial annular space therebetween to permit the pin member to be freely slidably inserted into box member 11.

A tubular drive or locking collar 16 is concentrically disposed in the bore of box 11 and is provided at its inner end with a slightly enlarged diameter section carrying relatively coarse external threads 14. The outer end portion of box 11 carries a section of coarse internal threads 15 mating with threads 14 for engagement therewith. Locking collar 16 has an axial bore 13 through which pin member 12 is freely slidable for coaxial movement into and out of box 11. By means of the threads 14 and 15, collar 16 may be axially advanced and retracted with respect to box 11 in response to corresponding rotation of collar 16. The outer end of the latter carries an annular enlarged head 17 about which is mounted a ring gear 18 which is in mesh with a pinion 19 carried by the end of a shaft 20 extending from a reversible motor 21 which is securely mounted on the exterior of box 11. A stop ring 22 is slidably mounted about the exterior of collar 16 between thread section 14 and head 17 and is externally threaded to be received in the outermost threads 15, being positioned therein to limit outward movement of collar 16 in box 11 to thereby prevent the collar from being completely unscrewed from box 11 during operation of the coupling.

Box 11 has a stepped bore comprising, an outer section 23, an intermediate section 24, and an inner section 25 of successively reduced diameters, the several sections having cylindrical walls. Sections 23 and 24 are joined by an inwardly sloping shoulder 26 and sections 24 and 25 by an inwardly sloping shoulder 27. The inner end of section 25 of the bore terminates in an inwardly sloping shoulder or land 28 adapted to form a seat to be engaged by a correspondingly bevelled end face 29 formed at the outer end of pin member 12. The latter is provided with a cylindrical circumferential recess 30 at a point spaced a short distance rearwardly from end face 29, the ends of the recess being defined by bevelled forward and rearward end walls 31 and 32, respectively. Recess 30 is axially spaced with respect to the end of pin member 12 so that when end face 29 is engaged with seat 28 (FIG. 2), recess 30 will be opposite outer bore sections 23 and 24. A non-metallic seal packing ring 33, such as a conventional O-ring, is seated in an annular groover 34 provided in the exterior of pin member 12 at a point intermediate surfaces 29 and 31. Seal ring 33 is thus positioned to seal with the cylindrical surface of bore section 25 when the pin member is fully inserted in the box so that a resilient seal will be provided between the coupling members which will supplement the metal-to-metal seal between end face 29 and seat 28.

A split latch ring 35 of resilient metallic construction is slidably disposed in the bore of box 11. In its normally expanded position the ring is disposed in bore section 23 and is provided at its inner end along the outer edge with a bevelled surface 36 which, in the expanded position of the ring, will seat on shoulder 26. The inner end of the ring at its inner periphery is provided with a bevelled surface 37 adapted to seat against shoulder 31 of recess 30 when the coupling elements are engaged, as will be described hereinafter. Ring 35 is shorter in length than bore sections 23 and 24 and is backed by a thrust or spacer ring 38 which is not split and is provided on the outer peripheral edge of its inner end with a bevelled surface 39 adapted to seat against shoulder 26 in the fully inserted position of the pin member, also as will appear subsequently. Arranged between the outer end of thrust ring 38 and the inner end of collar 16 are a pair of hard-surfaced bearing rings 40. These bearing rings function to permit rotation of locking collar 16 relative to box 11 and the latch elements with a minimum of friction.

The outer ends of the box and pin members are provided with suitable coupling elements, such as the bolt flanges 41 and 42, respectively, for connecting the respective coupling members to adjacent pipe sections or other tubular elements to be coupled together. It will be understood that other types of connections, such as threads, may be employed for this purpose.

In use, pin member 12 will be connected in upwardly extending position to a tubular element, such, for example, as a casing head H located on the land bottom L underlying a water bottom W, as seen in FIG. 5, flange 42 being bolted to a mating flange F provided on the upper end of casing head H. Box member 10 will be attached in depending relation, as shown also in FIG. 5, to a riser pipe section R by attachment of bolt flange 41 to a mating flange $F_1$ carried by the lower end of the riser pipe. The latter will be suspended by the usual hoisting equipment C mounted in a derrick D positioned on a vessel V floating on the surface of water body W. By means of the hoisting equipment, box member 10 will be lowered over the upwardly projecting end of pin member 12. The riser pipe and box member will be guided in any suitable manner into coupling engagement. As illustrated, a guide pipe G will be seated in the bore of casing head H by means of conventional pipe-gripping slips S, or the like, to provide a guide stem over which the box member and riser pipe may be guided to coupling position. Box member 10 will thus be lowered over pin member 12 until end face 29 on the pin member engages seat 28 in the box member. At the time of lowering the box member, collar 16 will be in the retracted position, illustrated in FIG. 1, in which position latch ring 35 will be seated against shoulder 26 and will be backed by thrust ring 38 and bearing rings 40. When the coupling members are fully engaged, as shown in FIGS. 2 and 5, power will be directed to motor 21 through suitable leads 43. Where motor 21 is a hydraulic or pneumatic motor, leads 43 may be pipes for transmitting hydraulic or pneumatic fluid to and from the motor by a pump K on the vessel or at some other remote location. Where motor 21 is an electric motor, leads 43 may be electrical conductors leading to a source of electrical power on the vessel.

Application of power to motor 21 will drive locking collar 16 through the gear train provided by gear 18 and pinion 19 in a direction to cause collar 16 to move inwardly of box 11. By making threads 14 and 15 of a suitable relatively coarse form and appropriate pitch, only a few turns of the coupling collar will be required to make up the coupling. As the coupling collar moves inwardly of the bore of the box, thrust ring 38 will be urged inwardly along the wall of bore section 23 and will force latch ring 35 off of shoulder 26 and into bore section 24 where it will be urged inwardly along the bottom of recess 30 until bevelled face 37 of the latch ring will engage shoulder 31 at the inner end of the recess, and thereby drive the end of pin member 12, carrying the end face 29 tightly against seat 28. The relative lengths of thrust ring 38 and latch ring 35 will be made such that the thrust ring will be seated on shoulder 26 when latch ring 35 has been moved to its locked position. When so-locked, it will be seen that latch ring 35 will prevent retraction of the pin member from the box member.

The axial movement of collar 16 required to effect locking and unlocking between pin member 12 and box member 10 will be permitted by axial sliding movement between gear 18 and pinion 19, gear 18 being sufficiently longer than pinion 19 to permit the required axial movements while maintaining the gears in meshing engagement.

To release the coupling, motor 21 will be reversed to produce retractive movement of coupling collar 16 for a distance sufficient to allow retraction of latch ring 35 into bore section 23. Thereupon, upward pull applied to the riser pipe from the surface will pull the box member upwardly over pin member 12, this action being effective to push the latch ring 35 and thrust ring 38 back into bore section 23 where latch ring 35 will expand to its original diameter, freeing the box member for complete withdrawal from pin member 12.

By providing the bearing rings 40 between the inner end of locking collar 16 and thrust ring 38, the rotation of the locking collar will be rendered largely frictionless, greatly speeding the connection and disconnection of the coupling members. It will be understood that other types of anti-friction bearings may be interposed between the locking collar and the thrust ring, but it is found that the use of one or two hard surfaced bearing rings of the kind illustrated, provides a very simple, low cost, and efficient anti-friction bearing means.

Various known types of relatively coarse threads may be usefully employed in the present invention; for example, a modified Acme thread ranging in pitch from one thread per inch to four threads per inch have been found very effective. In the first instance, only about three-quarters of a turn will be required for connecting and disconnecting the coupling. In the case of the four-thread structure, about three turns will be required. In any event, it will be evident that make-up to full tightness will be accomplished with very little rotation of the locking collar. Also, it will be seen that the telescopic connection afforded between the pin-and-box member obviates all danger to the threads and provides exceptionally quick and easy coupling between the coupling members under ordinarily difficult "stabbing" conditions.

FIG. 6 illustrates an assemblage of well head fittings commonly referred to as a "blowout preventer stack," carrying at its lower end the box member 10 of a coupling in accordance with this invention, and it will be understood that this entire assemblage may be lowered over the pin member secured, as in the previously described embodiments, to a well head H, the assemblage being lowered over a guide pipe G, as previously described.

From the foregoing description and the modifications illustrated, it will be seen that a powered coupling device, as herein described, lends itself particularly well to employment of power means operable from remote locations for connecting very large diameter tubular members and is especially useful in quickly connecting and disconnecting large and massive devices, such as the illustrative riser pipe and blowout preventor stack, to a submerged well head.

Also, in operations on the surface, it is sometimes very helpful to be able to disconnect a blowout preventer stack or a well Christmas tree when blowouts occur in order to make repairs or regain control of the well. Conventionally in such circumstances, it is necessary to send men to the well head to remove the well head-mounted structures, either by the use of a cutting torch or by other means, all of which are extremely hazardous. By the use of the present invention, such dis-connection may be made from a remote location. When a new stack or other set of control fittings is to be put in place, this may be done by means of a long-boom crane and the re-connection to the well head made from a remote location, thereby minimizing hazard to personnel and equipment.

It will be understood that various changes and modifications may be made in the illustrative embodiments within the scope of the appended claims but without departing from the spirit of this invention.

What I claim and desire to secure by Letters Patent is:

1. A powered quick coupling device, comprising, a tubular box member having an axial bore, a tubular pin member dimensioned to be freely slidable into said bore and to define a substantial annular space between the pin and box members, an inwardly inclined annular shoulder in said bore, an annular seat in said bore spaced inwardly from said shoulder engageable by the end of the pin member to form a metal-to-metal seal therewith, said pin member having a circumferential recess spaced from said end and defined by spaced end walls, a resilient non-metallic seal packing circumferentially disposed about said pin member between said recess and said end to seal with the wall of said bore, a split resilient latch ring slidably disposed in said bore about said pin member and initially seated against said shoulder, a locking collar slidably disposed about said pin member and extending into said annular space, a section of relatively coarse threads connecting the inner end of said collar to said box member, thrust means arranged in said bore between said collar and said latch ring operable in response to rotation of said collar relative to said box member in one direction to force said latch ring over said shoulder into said recess and into thrusting engagement with the forward end wall thereof to thereby lock the pin member against retractive movement relative to the box member with said end of the pin member disposed in said metal-to-metal sealing engagement with said annular seat, anti-friction bearing means operably disposed between said collar and said latch ring, and reversible power-operated means mounted on the box member operably connected to said drive collar for rotating the same.

2. A powered quick coupling device according to claim 1, wherein said power-operated means includes a motor, and a gear train drivingly connecting said motor to said collar.

3. A powered quick coupling device according to claim 2, wherein said gear train includes a pinion driven by said motor and a ring gear mounted about said collar in mesh with said pinion and longitudinally slidable relative thereto.

4. A powered quick coupling device according to claim 1, including means for delivering power fluid from a remote source to said power-operated means.

5. A powered quick coupling device according to claim 1, wherein said threads are modified Acme threads having a pitch in the range from one to four threads-per-inch.

References Cited

UNITED STATES PATENTS

| | | | |
|---|---|---|---|
| 1,989,674 | 8/1933 | Boas et al. | 285—356 X |
| 2,226,826 | 12/1940 | Miller | 285—321 X |
| 2,246,436 | 6/1941 | Downey. | |
| 2,628,111 | 2/1953 | Smalline | 285—310 |
| 2,795,985 | 6/1957 | Wilson. | |
| 2,907,242 | 10/1959 | Chakroff. | |
| 2,907,589 | 10/1959 | Knox | 285—332.2 X |
| 3,140,107 | 7/1964 | Hynes | 285—340 |
| 3,147,992 | 6/1964 | Haeber et al. | 285—374 X |

FOREIGN PATENTS

| | | |
|---|---|---|
| 622,062 | 6/1961 | Italy. |
| 116,571 | 6/1946 | Sweden. |

EDWARD C. ALLEN, *Primary Examiner.*

CARL W. TOMLIN, *Examiner.*

R. G. BERKLEY, *Assistant Examiner.*